INVENTOR
Donald R. Holdren

BY Schmieding and Fultz
ATTORNEYS

Aug. 11, 1959     D. R. HOLDREN     2,899,090
VEHICLE UNLOADING APPARATUS
Filed Feb. 4, 1955     2 Sheets-Sheet 2

INVENTOR
Donald R. Holdren

BY *Schmieding and Fultz*

ATTORNEYS

United States Patent Office 2,899,090
Patented Aug. 11, 1959

2,899,090

VEHICLE UNLOADING APPARATUS

Donald R. Holdren, West Liberty, Ohio, assignor to Holdren Brothers, Inc., West Liberty, Ohio, a corporation of Ohio Application February 4, 1955, Serial No. 486,106

3 Claims. (Cl. 214—82)

The present invention relates to apparatus for unloading vehicles used for transporting articles of various types.

Apparatus of this type comprise, in general, means mounted on a vehicle for moving the load across the bed of the vehicle and discharging the load from one end of the vehicle. In addition, apparatus of this type include and are driven by suitable power means. The present invention relates particularly to novel mounting means for the power unit for mounting such unit to the vehicle in driving relationship with the apparatus for removing the load from the bed.

The present invention further relates to novel apparatus for moving and discharging a load, which apparatus is adapted to apply motive force to the load in an even and efficient manner.

It is therefore an object of the present invention to provide a power unit for vehicle unloaders which is adapted to be removably mounted on each side of a vehicle and to be coupled, when in either position, with apparatus for removing the load from the bed of the vehicle. The power unit is provided with a novel torque arm and mounting means for same which are adapted to selectively maintain the torque arm in one direction of extension when the power means is coupled to the load removing apparatus at one side of the wagon, and to selectively maintain the torque arm in another direction of extension when the power means is coupled to the load moving apparatus at the other side of the vehicle. With this arrangement, a single power unit can be readily and efficiently attached and detached, on either side of the vehicle, thus enabling the vehicle to be maneuvered and positioned in close proximity to buildings and other objects. Moreover, crowding of the operator of the unloading apparatus is avoided.

It is another object of the present invention to provide a wagon unloader which includes a false end gate structure for engaging and moving the load from the bed, and novel driving apparatus for efficiently and evenly moving such structure back and forth across the bed of the vehicle.

It is another object of the present invention to provide a wagon unloader which includes a false end gate structure for engaging and moving the load from the bed, which structure is adapted to be easily and quickly rigged on and removed from mounted relationship with the vehicle.

Further objects and advantages of the present invention will be apparent from the following description, reference being had to the accompanying drawings wherein a preferred form of embodiment of the invention is clearly shown.

Figure 1:
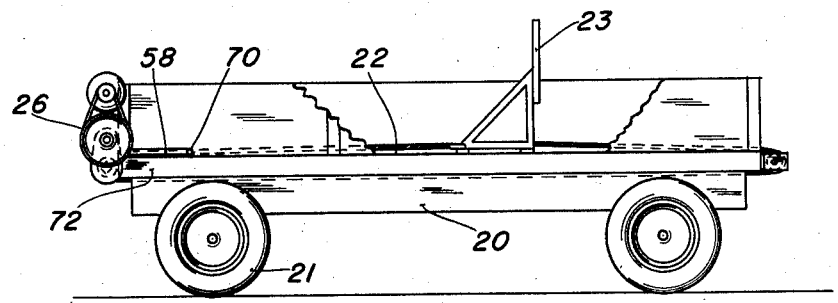
Figure 1 is a side elevational view of a vehicle equipped with the unloading apparatus of the present invention.

Figure 1 illustrates a wagon for transporting various farm products such as hay, corn, grain and various field crops. The wagon includes a frame 20 supported by wheels 21. The frame includes a bed 22 and a false end gate, indicated generally at 23, is movably carried by the bed. A power unit, indicated generally at 26, is removably mounted to the wagon and adapted to move the false end gate 23 back and forth in a manner later to be described.

Figure 2:
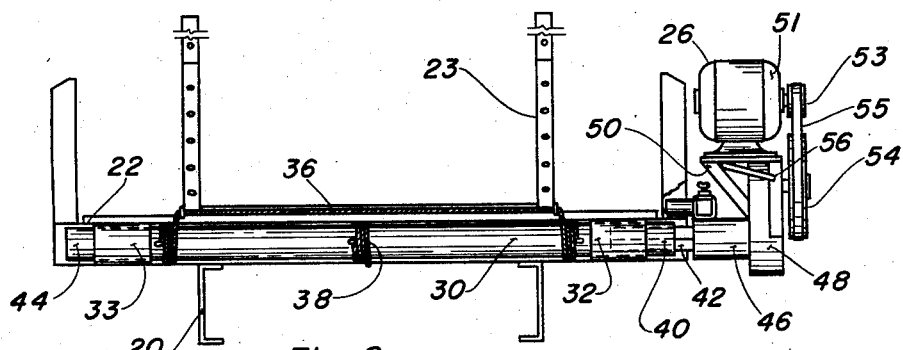
Figure 2 is a partial rear elevational view of the vehicle and unloading apparatus of Figure 1.

Referring next to Figure 2, the rear end of bed 22 rotatably carries a laterally extending roller 30 which is journaled for rotation in the bearings 32 and 33. Roller 30 forms part of the apparatus permanently secured to the wagon which serves to move the load across the bed when the vehicle is being unloaded. In general, roller 30 is adapted to wind, on itself, a cable 36. Cable 36 extends to the false end gate 23, and, upon winding up of the cable upon the roller 30, the false end gate is drawn towards the rear end of the vehicle for discharging a load therefrom. Roller 30 is also adapted to wind about itself a second cable 38 which second cable is appropriately connected with the false end gate 23 such that the winding of cable 38, on roller 30, serves to return the false end gate to the front end of the vehicle and thus prepare the vehicle for receiving a new load of products.

As viewed from the rear of the vehicle in Figure 2, one end of roller 30 is provided with a socket 40 adapted to receive, in sliding relationship, a drive shaft 42 carried by the driving unit 26. The socket 40 is formed as a hole of square or other suitable cross section, and the drive shaft 42 is formed to the same cross sectional shape and adapted to fit internally into the socket so that the drive shaft 42 and the roller 30 are coupled together in driving relationship. The other end of the roller 30 is provided with an identical socket 44 which is also adapted to receive, in fitted, sliding relationship, the drive shaft 42 of the prime mover unit 26.

With further reference to Figure 2, it is seen that drive shaft 42 is rotatably journaled in a bearing housing 46 which forms a portion of a gear box 48. Gear box 48 carries a bracket 50 which serves as a mounting for a prime mover 51. The gear box 48 is driven by the prime mover 51 by means of pulleys 53 and 54 and a belt 55. Hence it is seen that the static weight of the gear box 48 and the prime mover 51 is supported by the roller 30 due to the rigid coupling provided between the socket 40 and the drive shaft 42.

Figure 4:
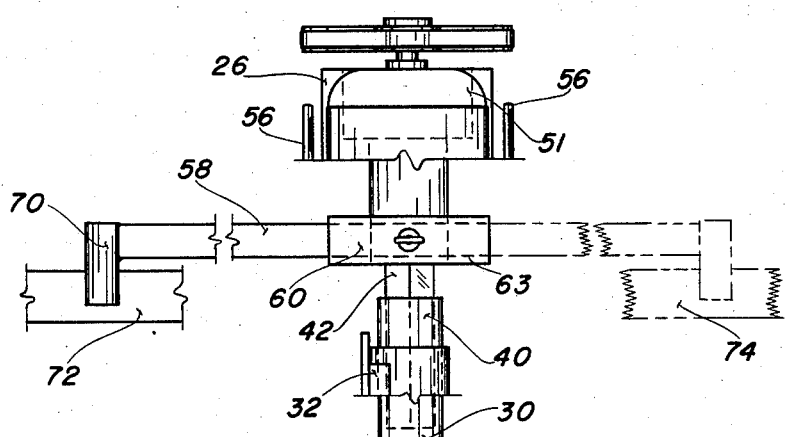
Figure 4 is a partial top elevational view of the power unit comprising a portion of the unloading apparatus of the present invention.
Figure 5:
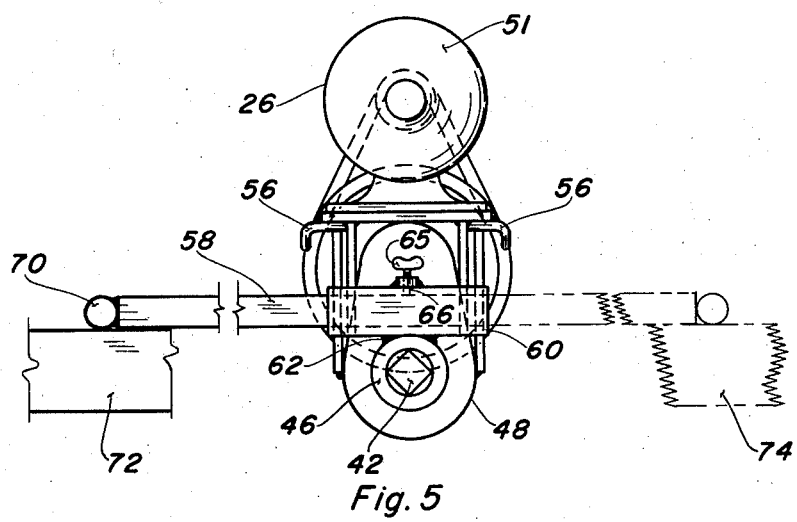
Figure 5 is a front elevational view of the power unit of Figure 4.

As is best seen in Figures 4 and 5, the power unit 26 is provided with a torque arm 58 which is removably mounted to the power unit by means of a socket means indicated generally at 60. Socket means 60 can be mounted to the power unit by welding the under surface of the socket to the upper surface of the housing as is indicated at 62 in Figure 5. Socket means 60 is provided with an open ended hole 63 which adapts the socket means for receiving the torque arm into either end of the hole whereby the torque arm can be selectively extended in opposite lateral directions of extension.

To lock the torque arm 58 in the socket means 60 a set screw 65 is carried in a threaded hole 66 in the upper wall of the socket means. After the torque arms 58 has been inserted in the socket means 60 the set screw 65 is tightened into locking relationship with the outer surface of the torque arm 58.

The outer end of torque arm 58 carries a member 70 which extends transversely to the longitudinal axis of the torque arm as best seen in Figure 4. With this arrangement, when the power means 26 is attached to the right side of the vehicle, as seen in Figures 1 and 2, by inserting the drive shaft 42 into the right socket 40 of the roller 30, the member 70 is rested on the upper surface of the frame member 72 which may comprise a portion of the right side of the vehicle bed.

When the shaft 42 is rotated in a clockwise direction, as viewed in Figure 5, there will be a tendency for the torque reaction to rotate the power means 26 in a counterclockwise direction. Due to the presence of the torque arm 58, however, and the engagement of member 72 by the member 70, rotation of the power unit about the axis of shaft 42 is prevented.

When the power means 26 is mounted on the left side of the vehicle, by inserting drive shaft 42 in the socket 44 on the other end of the roller 30, the drive shaft 42 must then be rotated in the opposite direction by reversing direction of rotation of the prime mover 51 in order to effect the unloading operation. When the power unit 26 is installed in such second position of operation, on the left side of the vehicle, torque arm 58 is removed from the socket means 60 by unloosening the screw 65, and the torque arm is then inserted in the other end of the socket means 60 in the manner indicated by dotted lines in Figures 4 and 5. Power means 26 is then mounted on roller 30 with the torque arm 58 overlying the member 74 which extends forwardly of the power means on the left side of the vehicle. With the power means being rotated in a counterclockwise direction, as required in effecting the unloading operation from the left side, there will be a tendency to rotate the power means 26 in a clockwise direction about the axis of shaft 42. Due to the presence of the torque arm 58, in the configuration illustrated by the dotted lines of Figure 4, rotation of the power unit will be prevented due to the engagement of the torque arm with the top surface of the bed member 74.

Figure 3:
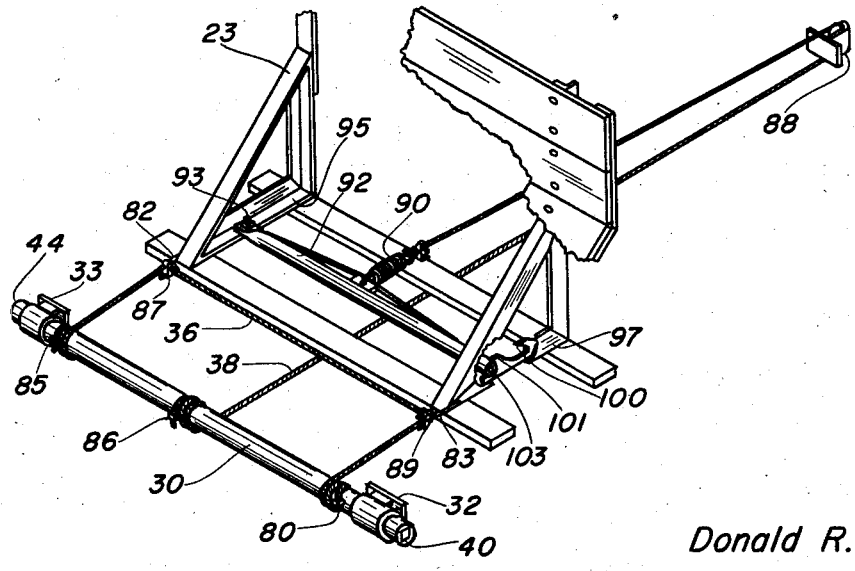
Figure 3 is a broken perspective view of the load moving means comprising a portion of the unloading apparatus of the present invention.

Reference is next made to the apparatus for moving the load across the bed of the vehicle as is best seen in Figure 3. The main unloading cable 36 has one of its ends secured at 80 to the roller 30. Cable 36 then passes through the hooks 82 and 83 on the forward end of the failse end gate 23 and the other end of the cble 36 is secured at 85 to the roller 30.

The return cable 38, which serves to return the false end gate 23 back to the forward end of the wagon after the load has been dumped, is secured at 86 to the center of roller 30. Cable 38 then extends rearwardly under the bed 22, passes around the pulley 88, and thence forwardly across the upper surface of the bed 22. The forward end of the portion of cable 38, which extends above the bed, is secured to a spring 90 which is in turn secured to a laterally extending take-up bar 92 which take-up bar forms a portion of the frame structure of the false end gate 23. With further reference to Figure 3, it will be noted that one end of the take-up bar 92 is pivotally secured at 93 to member 95 which comprises a portion of the end gate structure.

Referring next to the structural member 97, which is oppositely disposed from the member 95 in the false end gate structure, it is seen that such member carries a plurality of ratchet teeth, two of which are indicated at 100 and 101. The unpivoted end 103 of the take-up bar 92 is adapted to lockingly engage the ratchet teeth 100 and 101 upon stretching of spring 90, since the cables 36 and 38 are arranged with appropriate lengths, when combined with the unstretched length of spring 90, such that the ends 103 of the take-up bar fall short of the gate of the ratchet teeth until the spring 90 is stretched. The take-up bar 92 is pulled forwardly, pivoting same on the pivot 93, until the ratchet tooth 100 is lockingly engaged by end 103 of the take-up bar 92.

In hooking up the false end gate, it is moved nearly to the front of the bed. The ends of the cable 36 are clamped to the spaced locations 80 and 85 on the roller 30. The central portion of cable 36 is then passed through the two pull hooks 82 and 83 in the forward end of the false end gate. The false end gate is then pulled to the front of the bed and it is carefully squared with the bed of the wagon and then securely clamped in this position. Using a hand crank, all of the available slack is taken up, in cable 36, and two clamps 87 and 89 are then placed on cable 36 on the inside of each of the pull hooks 82 and 83. In this manner, the clamps 87 and 89 serve to keep the false end gate square with the bed 30 in operation of the apparatus.

To hook up the return cable 38, an end of the cable is secured to roller 30 at the central position 86 such that the cable will wrap around the roller in the opposite direction to cable 36. The return cable 38 is then passed forwardly under the bed, up through the pulley 88, and then back across the top of the bed to the false end gate 23. With the take-up bar 92 disengaged from the ratchet teeth 100 and 101, all the slack is taken up from the cable 38 and then cable 38 is attached to spring 90 and the spring 90 is attached to the take-up bar 92 such that the end 103 of the take-up bar will fall short of latching with the ratchet teeth. The hook up is completed by sitting on the bed, placing the heel against the unpivoted end of the take-up bar 92 and then pushing on the take-up bar with the foot or heel, using the bar as a lever until the end 102 of the take-up bar is in latching engagement with the first ratchet tooth 100. After running the false end gate 23 back and forth several times by means of a hand crank, it may be possible to force the take-up bar 92 into latching engagement with the second ratchet tooth 101. With this arrangement, the spring 90 can be maintained stretched at all times so that the cables 36 and 38 will be maintained taut.

In summary, the present invention provides an unloading apparatus for vehicles, such as farm wagons and the like, wherein a novel power unit is provided which can be readily attached and detached to either side of the vehicle. Hence the vehicle can be maneuvered and positioned near to buildings and other obstacles, and operation of the apparatus need never be done under crowded conditions. Moreover, the present apparatus provides novel load moving means of inexpensive construction, which can be easily attached to and removed from a vehicle.

While the form of embodiment of the present invention as herein disclosed constitutes a preferred form, it is to be understood that other forms might be adopted, all coming within the scope of the claims which follow:

I claim:

1. An unloading apparatus for vehicles comprising, in combination, product moving means adapted to be mounted on the frame of a vehicle and moved across the bed thereof; roller means rotatably mounted on an end of said vehicle; a cable means connected between said roller and said product moving means whereby rotation of said roller winds said cable and moves said product moving means; power means for rotating said roller, said power means including a drive shaft; coupling means for detachably engaging an end of said drive shaft in driving relationship with the product moving means on one side of the vehicle; a second coupling means for detachably engaging said end of said drive shaft in driving relationship with the product moving means on the other side of the vehicle; a torque arm carried by said power means and adapted to engage said vehicle; and mounting means for attaching the torque arm to the power means, said mounting means being adapted to selectively maintain the longitudinal axis of said torque arm in one direction of extension when the power means is coupled to one side of the vehicle and in another direction of extension transversely to the axis of rotation of said drive shaft when the power means is coupled to the other side of the vehicle, said longitudinal axis of said torque arm being disposed transversely to the axis of rotation of said drive shaft when said torque arm is mounted to said power means.

2. An unloading apparatus for vehicles comprising, in combination, product moving means adapted to be mounted on the frame of a vehicle and moved across the bed thereof; roller means rotatably mounted on an end of said vehicle; a cable means connected between said roller and said product moving means whereby rotation of said roller winds said cable and moves said product moving means; power means for rotating said roller, said power means including a drive shaft; coupling means for rigidly and detachably supporting an end of said drive shaft in driving relationship with the product moving means on one side of the vehicle; a second coupling means for rigidly and detachably supporting said end of said drive shaft in driving relationship with the product moving means on the other side of the vehicle; a torque arm carried by said power means and adapted to engage said vehicle; and mounting means for attaching the torque arm to the power means, said mounting means being adapted to selectively maintain the longitudinal axis of said torque arm in one direction of extension when the power means is coupled to one side of the vehicle and in another direction of extension when the power means is coupled to the other side of the vehicle, said longitudinal axis of said torque arm being disposed transversely to the axis of rotation of said drive shaft when said torque arm is mounted to said power means.

3. An unloading apparatus for vehicles comprising, in combination, product moving means adapted to be mounted on the frame of a vehicle and moved across the bed thereof; roller means rotatably mounted on an end of said vehicle; a cable means connected between said roller and said product moving means whereby rotation of said roller winds said cable and moves said product moving means; power means for rotating said roller, said power means including a shaft; coupling means for detachably engaging an end of said drive shaft in driving relationship with the product moving means on one side of the vehicle; a second coupling means for detachably engaging said end of said drive shaft in driving relationship with the product moving means on the other side of the vehicle; means mounted on said power means and forming oppositely disposed sockets, the longitudinal axis of said sockets being disposed transversely to the axis of rotation of said drive shaft; and a torque arm adapted to be selectively inserted in one of said sockets and extended to engage said vehicle, when the power means is connected with one of said couplings, and to be selectively inserted in the other of said sockets and extended to engage said vehicle when the power means is connected with the other of said couplings, the longitudinal axis of said torque arm being coextensive with said longitudinal axis of said sockets whereby said torque arm extends transversely to said axis of rotation of said drive shaft when said torque arm is mounted in either of said directions of extension.

References Cited in the file of this patent
UNITED STATES PATENTS

| | | |
|---|---|---|
| 2,463,643 | Recker | Mar. 8, 1949 |
| 2,488,217 | McCall | Nov. 15, 1949 |
| 2,563,158 | Claffey | Aug. 7, 1951 |
| 2,606,677 | Snedeger | Aug. 12, 1952 |
| 2,627,761 | Recker | Feb. 10, 1953 |